(12) United States Patent
Gothier

(10) Patent No.: US 6,712,419 B1
(45) Date of Patent: Mar. 30, 2004

(54) HOLD-DOWN SYSTEM FOR A FLEXIBLE COVER OF AN OPEN-TOPPED CONTAINER

(75) Inventor: Richard Gothier, Gilbert, AZ (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 10/314,006

(22) Filed: Dec. 6, 2002

(51) Int. Cl.[7] ................................................ B60P 7/04
(52) U.S. Cl. ..................................... 296/100.15; 296/98
(58) Field of Search ............................ 296/100.15, 98, 296/100.14, 100.16

(56) References Cited

U.S. PATENT DOCUMENTS

| 3,975,047 | A | * | 8/1976 | McClellan |
| 4,341,416 | A | | 7/1982 | Richard |
| 4,516,802 | A | | 5/1985 | Compton |
| 4,740,029 | A | | 4/1988 | Tuerk |
| 5,031,955 | A | | 7/1991 | Searfoss |
| 5,125,713 | A | * | 6/1992 | Willingham et al. .......... 296/98 |
| 5,957,523 | A | | 9/1999 | Haddad, Jr. |
| 6,338,521 | B1 | * | 1/2002 | Henning ....................... 296/98 |
| 6,464,283 | B2 | * | 10/2002 | Haddad, Jr. .................. 296/98 |
| 6,474,719 | B2 | * | 11/2002 | Henning ....................... 296/98 |
| 6,575,518 | B1 | * | 6/2003 | Henning ....................... 296/98 |
| 2002/0140249 | A1 | * | 10/2002 | Henning ....................... 296/98 |
| 2003/0034666 | A1 | * | 2/2003 | Wood ........................... 296/98 |

* cited by examiner

Primary Examiner—D. Glenn Dayoan
Assistant Examiner—H. Gutman
(74) Attorney, Agent, or Firm—Maginot, Moore & Beck

(57) ABSTRACT

A hold-down system for a cover of an open-topped container, such as a dump truck body, includes a hold-down member operatively coupled to a biasing mechanism. The biasing mechanism is disposed within the container, and preferably below the hold-down member. The hold-down member is adapted to exert tension against the cover via the biasing mechanism. The biasing mechanism may include biased reels having respective biasing cordage such as cables.

19 Claims, 4 Drawing Sheets

HOLD-DOWN SYSTEM FOR A FLEXIBLE COVER OF AN OPEN-TOPPED CONTAINER

BACKGROUND OF THE INVENTION

The present invention relates to flexible covers or tarping systems for open-topped containers. The invention is particularly related to tarping systems for use with hauling vehicles, such as dump trucks, where the flexible cover or tarpaulin is extended across the open top of the truck body/container.

Many hauling vehicles, such as dump trucks, include open-topped containers useful for hauling or storing various materials. For example, in a typical dump truck application, the dump body is used to haul a variety of particular material, such as gravel, aggregate or similar products. In addition, some hauling vehicles carry organic materials, such as grain or produce.

Depending upon the nature of the materials stored in the open-topped container, it is often desirable to provide a cover for the container. Of course, rigid covers are well known that may be hinged from end of the container body. These rigid covers have gradually given way in the trucking industry to flexible tarping systems because the flexible tarpaulin can be easily stowed when a cover is not necessary, such as when the dump truck is being loaded. Moreover, the flexible tarp is much easier to deploy than a rigid cover, and is easier to replace when it becomes worn or damaged. Furthermore, in some instances the flexible tarp provides a tighter environmental seal for the contents of the container than is provided by a rigid cover.

A variety of tarping systems have been developed that are geared, to particular hauling vehicle applications. Once such tarping system for use with dump trucks is the Easy Pull® tarping system of Aero Industries, Inc. The Easy Pull® system includes a flexible tarp that is wound around a spool at one end of a dump bed. A rope attached to the free end of the tarp can be used to unwind the tarp from the roller to extend along the length of the dump bed.

Another cover system particularly suited for open-topped containers on hauling vehicles is the Easy Cover® tarping system, also of Aero Industries, Inc. The Easy Cover® tarping system includes a U-shaped bail member that is pivotally mounted at its end to the base of the container body. The horizontal section of the U-shaped bail is attached to the tarp, while the free ends of the vertical elements are pivotably mounted to the truck body. In one application, the Easy Cover® tarping system allows the tarp to be manually pulled in a sweeping arc over the container load.

In another application of the Easy Cover® system, an actuation mechanism is provided that automatically pivots the U-shaped bail member to deploy the tarp over the load within the open-topped container. When the actuation mechanism is released, it automatically pivots the bar, thereby unfurling the tarp from the tarp roller at the front of the vehicle. A hand crank or powered motor can be provided to rotate the tarp roller to retract or wind the tarp when it is desired to open the container top.

A problem with all of the above cover/tarp systems and other cover systems is that once the tarp or cover is deployed, the tarp is not necessarily taut or tight against the load carried by the container. Since the cover is not taut against the load during transportation, there is a tendency for wind, which may flow across or beneath the cover, to cause billowing and flapping of the cover. Because of the elevated mounting position of the cover housing, a persistent void is created by such prior art cover systems. Such a void allows wind to continue to flow beneath the cover causing further billowing and flapping, accelerating cover wear and causing excessive stress in the system. Wear and fatigue in the cover system degrades the effectiveness of the cover system.

In order to alleviate the above condition, various systems have been developed that are designed to keep the cover relatively taut when extended. One simple manner of keeping the cover taut is provided in U.S. Pat. No. 4,516,802 issued to Compton on May 14, 1985 (hereinafter "the '802 Patent"). The '802 Patent uses a flexible cord strung around the periphery of the cover. The cord engages a plurality of hooks secured to the outside of the container in order to maintain the cover taut. This approach, however, is not desirable since it requires a user to manually connect the flexible cord to the hooks.

U.S. Pat. No. 4,341,416 issued to Richard on Jul. 27, 1982 (hereinafter "the '416 Patent") discloses another manner of trying to maintain the cover taut over a load. In one embodiment of the '416 Patent, a plurality of arms or links extend from the headboard to the cover. The links are adapted to allow the front edge of the cover to swing from open to closed positions and to accumulate or roll-up on a cover take-up roll.

Another example is found in U.S. Pat. No. 5,031,955 issued to Searfoss on Jul. 16, 1991 (hereinafter "the '955 Patent"). The '955 Patent utilizes a tension assembly having a tension bail extending over the front of the cover from outside of the container. The tension bail includes legs extending along the outside of the container and attached to the cover (rear) bail legs. The tension bail is thus lowered when the cover is extended by the cover bail. A similar mechanism is disclosed in U.S. Pat. No. 5,957,523 issued to Haddad, Jr. on Sep. 28, 1999 (hereinafter "the '523 Patent"). The '523 Patent discloses a tensioning device for use with a flexible cover on an open top container that is operative to maintain the cover taut. A tensioning bar is spring biased downwardly onto the top of the cover adjacent the truck cab by a pair of oppositely situated arms that extend from the outside of the upper cab area.

The '955 Patent, the '523 Patent and other similar mechanisms operate a tensioning bar from the outside of the container. Consequently, the tensioning bar cannot extend into the container (i.e. through a plane defined by the top surface of the container) in order to have the cover accommodate loads of various volumes. Additionally, the hold-down systems epitomized by the '955 and '523 Patents utilize spring biasing to push down upon the tensioning arm and thus the cover.

Another system, marketed by the assignee of the present invention, is the Stay-Put® hold-down system. The Stay-Put® system utilizes a hold-down system having a hold-down bar that is interior to the container. The hold-down bar of the Stay-Put® system is thus able to extend below the plane of the top of the container. The hold-down bar is coupled to rigid arms that are mounted inside of the walls of the container but above the tension arm. The Stay-Put® hold-down system, however, still exerts a bias or pressure downwardly from the top onto the cover.

There remains a need for an improved tension/hold-down system or system for holding a cover such as a flexible tarp down and/or taut when in its extended or deployed position. The hold-down must be capable of keeping the cover tightly down over a load in the container, even against road vibration and wind force generated when traveling at highway speeds. In addition, the improved system would be easily installed, and potentially capable of retrofit to existing flexible tarping systems. The improved hold-down system would also provide a more positive retention force against the cover.

SUMMARY OF THE INVENTION

In order to address these unresolved needs, the present invention provides a hold-down system for a cover or cover system for an open-top container that is primarily disposed interior of the container/container walls. The hold-down system includes a hold-down member that is disposed over the outer surface of the cover. The hold-down member is pulled downwardly onto the cover to take up slack in the cover by a biasing mechanism that is disposed within the interior of the container. In this manner, the cover is pulled downwardly (tensioned) over the load when the cover is extended. Preferably, the hold-down member is pulled below the top of the container so that the cover is consequently pulled at or below the top of the container for at least a portion of the length of the cover during cover extension and/or deployment. When the cover is retracted, the hold-down member maintains tension on the cover.

As the cover is extended or deployed, the present biasing mechanism maintains a downward pull against the outside of the cover. This takes up slack in the cover and/or keeps the cover taut and thus directs the cover toward and onto a load in the container. In the retracted mode, tension is maintained against the cover while allowing almost full cover retraction. In a preferred embodiment, the biasing mechanism is mounted toward the front of the container.

The biasing mechanism, in one form, may include biased reels, spools or the like, and associated cordage, mounted on opposite sides of the container. The cordage can be situated (e.g. wound) on respective biased reels and is operative to be attached at a free end to the hold-down member. In the preferred embodiment, the cordage is wire cable. The biased reels can be biased by a torsion spring that is calibrated to maintain a sufficient tension on the cordage, and ultimately a sufficient downward force applied by the hold-down member to the cover. Sufficient upward force (e.g. pulling) overcomes the bias of the reels to extend the length of the cordage and the position of the hold-down member relative to the truck container top, load, or cover.

The cordage is coupled to the hold-down member preferably at opposite ends thereof. The hold-down member can have ends configured to be connected to the cordage, or can include a spindle onto which the cordage is attached or connected. Alternatively, the cordage can pass through the hold-down member, with the opposite ends of the cordage engaging a biasing mechanism at opposite sides of the container.

The biasing mechanism is calibrated to exert a pulling or downward force against the cover without creating undue stress on the cover. This force can be overcome to allow the hold-down member to move relative to the biasing mechanism/system in response to tension in or movement of the tarp as it is deployed or retracted.

According to an embodiment of the subject invention, there is contemplated a hold-down system for a cover/cover system for an open-topped container, in which the cover/cover system includes a tension or biasing mechanism mounted interior of the container and a hold-down member operatively coupled to the tension mechanism and interacting with the cover.

In one form there is provided a hold-down system for maintaining a cover for an open-topped container taut. The hold-down system includes a hold-down member that is adapted to be disposed interior of the cover. A biasing mechanism is disposed interior of the open-topped container. Cordage couples the hold-down member to the biasing mechanism. The biasing mechanism exerts a constant downward tension against the hold-down member and thus the cover.

In another form of the invention, there is provided a hold-down system that includes a biasing subsystem, a hold-down member, and means for operatively coupling the biasing subsystem to the hold-down member. The biasing subsystem is situated within the container. The hold-down member is adapted to extend along an outside surface of the cover. The biasing subsystem generates a constant pull-down force on the hold-down member wherein the hold-down member provides a constant force against the cover.

In still another form of the invention, there is provided a method of maintaining a cover for an open topped container taut. The method includes: (a) providing a hold-down member that is adapted to extend a distance along an outside surface of the cover; (b) providing a first biasing mechanism on a first inside surface of the container, the first biasing mechanism operative to provide a constant tensioning against a first connecting member; (c) providing a second biasing mechanism on a second inside surface of the container, the second biasing mechanism operative to provide a constant tensioning against a second connecting member; and (d) coupling the first and second connecting members to the hold-down member such that the constant tensioning is translated to the hold-down member.

One object of the present invention is to provide a biasing mechanism for holding a deployed tarp down over a load within a container, even when the tarp is subject to road vibration and wind.

A further benefit of the invention is realized in features that allow the invention to be retrofitted to existing tarping systems. These and other benefits and objects of the invention will be appreciated upon consideration of the following written description and accompanying figures.

DESCRIPTION OF THE PREFERRED EMBODIMENTS

Figure 1:
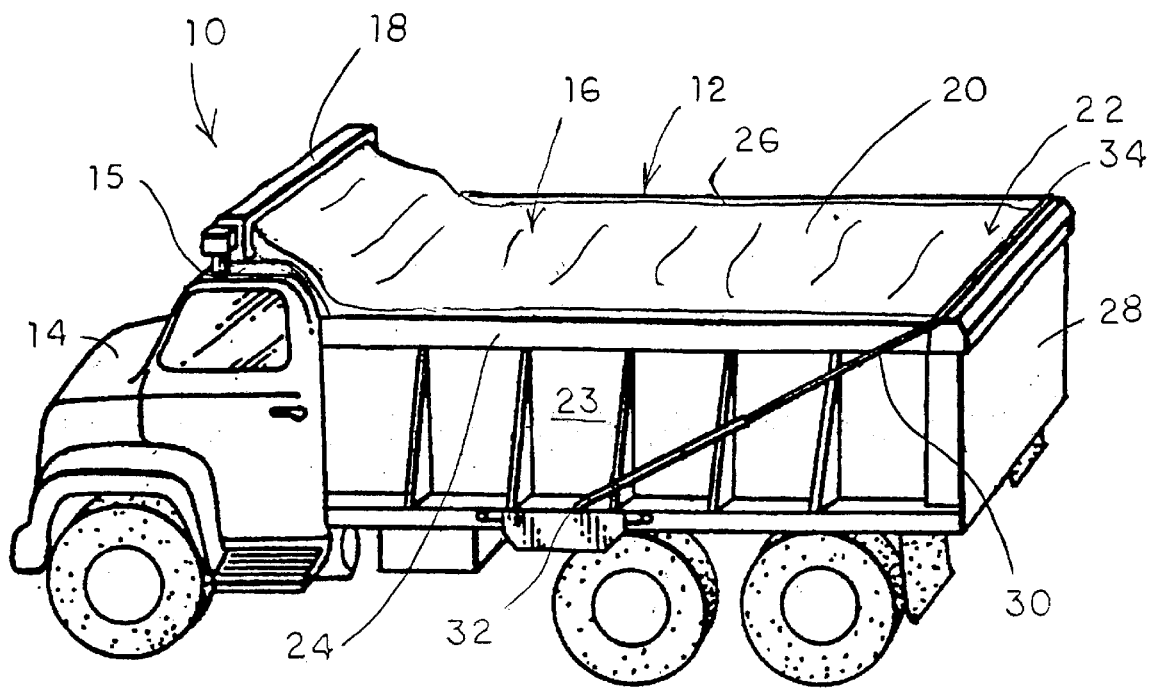
FIG. 1 is a side perspective view of an exemplary vehicle, here illustrated as a dump truck, having a flexible cover system spanning the open top container of the vehicle to which the subject invention pertains.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Referring now to FIG. 1, a truck 10 is shown having an open top container, receptacle or the like 12. It should be appreciated that the truck 10 is representative of any type of vehicle that has an open top container, or that tows an open top container. For illustrative purposes, the truck 10 is illustrated as a dump truck. It should be appreciated that the subject invention may be utilized in a variety of types of vehicles that have or carry an open top container, receptacle or the like, or that are containers in and of themselves.

Figure 2:
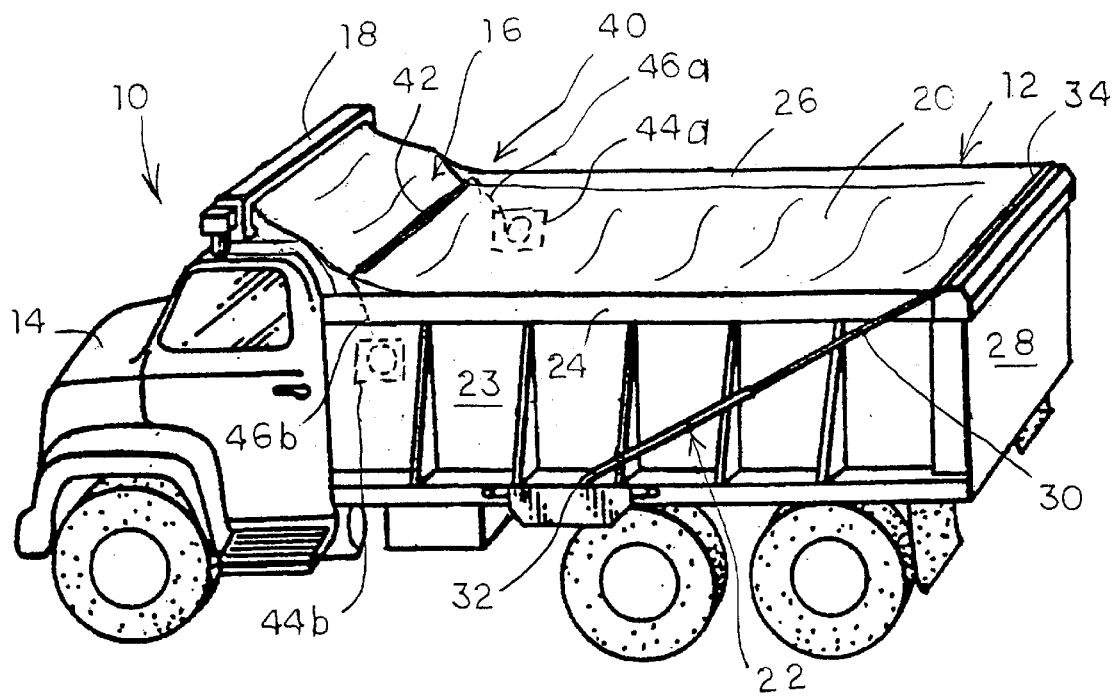
FIG. 2 is a side perspective view of the exemplary vehicle shown in FIG. 1 including a hold-down system for the flexible tarping system in accordance with the one embodiment of the subject invention.
Figure 3:
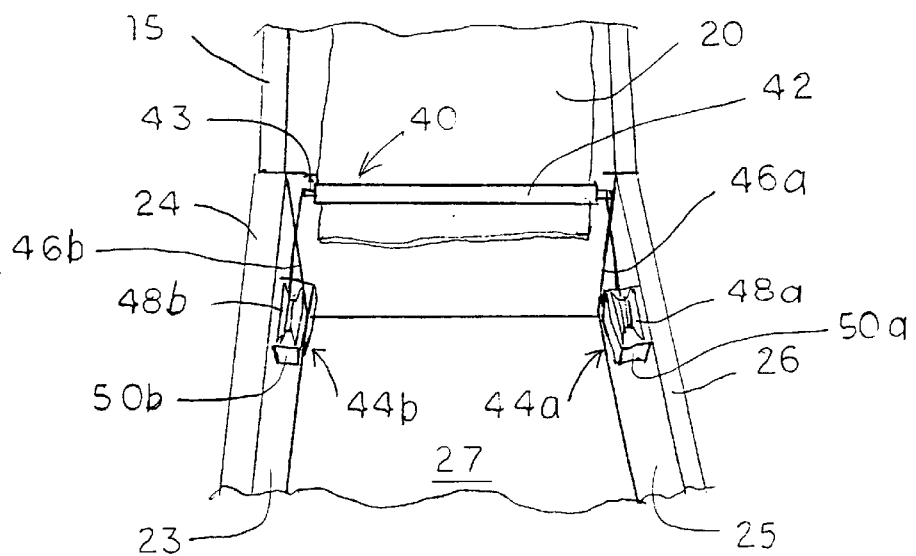
FIG. 3 is a partial top perspective view of the hold-down system depicted in FIG. 2, with the hold-down system shown retaining the cover (i.e. providing tension against the cover) of the flexible cover system in accordance with one embodiment of the present invention.

Referring to FIGS. 2 and 3, the truck 10 has an open top container 12 that is associated with a truck cab 14. The container 12 has an open top, a first side wall 23, a second side wall 25, a rear wall 28, and a bottom wall 27 that defines an interior volume that is utilized to hold a load L (see FIGS. 4, 5A–5C). The truck 10 is shown with a flexible cover system, generally designated 16. In particular, the system 16 includes a flexible cover, or tarpaulin (tarp) 20 that is sized to cover the open top of the container 12. The tarp can be of any known construction. The container 12 can optionally include side rails S that are supported on the side walls 23, 25 as is known in the art.

The flexible tarp 20 is connected at one end to a retraction mechanism 18 such as is known in the art. The retraction mechanism 18 is shown supported on a cab shield 15 that extends from the container 12. Other retraction mechanisms are contemplated, including a mechanism that mounts directly to the truck cab 14, or that is supported by a separate frame mounted to the frame of the vehicle. The connection of the tarp 20 to the retraction mechanism 18 can be in accordance with well-known approaches. Moreover, any type of retraction mechanism is contemplated that can retract the extended tarp to a stowed position (see FIG. 5A). The retraction mechanism 18 also allows deployment of the cover 20. In a typical construction, the tarp is wound onto a spool. For illustrative purposes, the retraction mechanism can be of the type found on the EASY COVER® system marketed by Aero Industries, Inc.

Figure 5A:
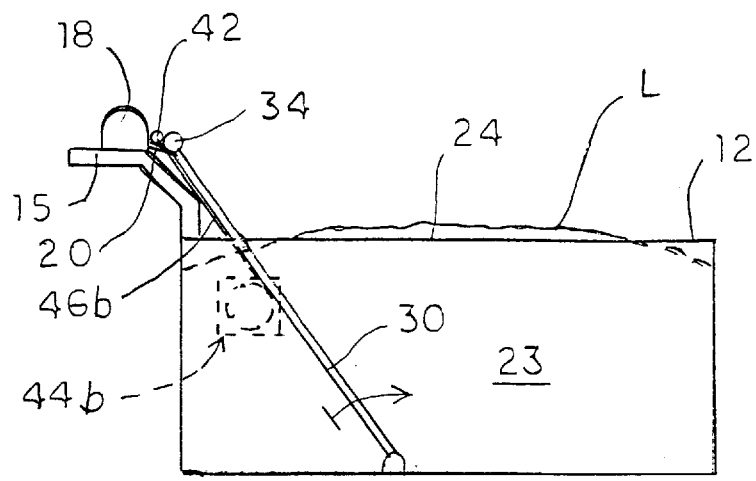
FIGS. 5A, 5B and 5C are side plan views of the container of dump truck of FIG. 2 with the hold-down system of the present invention shown in different stages of retraction/deployment.

The tarp 20 also includes an opposite second end that is configured to engage an extension mechanism 22. In one specific embodiment, the second end is configured to be connected to a deployment bar 34 that forms part of the extension mechanism 22. The bar 34 is coupled at each end to a bail arm 30 that extends along the outside of the side wall 23 and is pivotally connected at a pivot point 32 external to the container 12. The bail arms of the extension mechanism 22 pivot between a closed or retracted position such that the bar 34 is proximate the retraction mechanism 18 (such as is depicted in FIG. 5A), and an open or extended position in which the deployment bar 34 is proximate the rear 28 of the container 12 (such as is depicted in FIGS. 1, 2 and 5C).

The extension mechanism 22 can be of a variety of manual, spring-biased or powered types. In the illustrated embodiment, the extension mechanism can of the type found in the EASY COVER® system marketed by Aero Industries, Inc., in which the bail arms 30 are spring biased at the pivot point 32 toward the closed position. Alternatively, the extension mechanism can simply constitute a pull rope attached to the end of the tarp or to a bar (such as deployment bar 34) connected to the tarp. A mechanism of this type is implemented in the EASY PULL® System, also marketed by Aero Industries.

Referring now to FIG. 2 the truck 10 is depicted with a hold-down system, biasing means or the like, generally designated 40. It should be appreciated that the hold-down system 40 may be part of the container 12 and/or the flexible cover system 16. Alternatively, the truck 10 may be retrofitted with the hold-down system 40 in the case that the system 40 is provided as an add-on kit. In both instances, the hold-down system 40 of one embodiment of the invention can include a hold-down member 42, which can be in the form of a bar, cross bar, roller or the like. The system further includes a first biasing mechanism or member 44a disposed on an inside surface of the side wall 25, and a second biasing mechanism or member 44b disposed on an inside surface of the opposite side wall 23. Both biasing mechanisms are disposed within the interior of the container 12.

The invention further contemplates first and second cordage members 46a and 46b that are respectively connected at one end to the first and second biasing mechanisms 44a and 44b. In addition, the other end of the cordage members are connected to the hold-down bar 42, so the members 46a, b can constitute a means for operatively coupling the biasing mechanisms to the hold-down bar. The hold-down bar 42 can include a spindle 43 extending therethrough, and the cordage members can be attached to the corresponding ends of the spindle in any suitable manner.

In a preferred embodiment, the first and second cordage members 46a and 46b can be in the form of a flexible cable or rope. Most preferably, the cordage members are small gage steel cables, such as 15 gage cable. The wire can be coated to resist corrosion and reduce any chafing effects. Alternatively, the cordage members can be nylon cables. In the preferred embodiment, two cordage members are provided. In a modified embodiment, a single cable can be connected at its opposite ends to the opposite biasing mechanisms 44a and 44b. With this embodiment, the single cable can pass through a bore formed in hold-down bar 42.

The first and second cables 46a, 46b can be connected to the hold-down bar 42 or spindle 43 in a variety of manners. For instance, the bar or spindle can be provided with an eyelet through which the cable passes, with cable end wound or lashed onto the cable itself to hold the attachment. Alternatively, the cable end can be welded to the hold-down bar or spindle, or a mechanical crimping or clamp can be utilized. Where the cordage member is a rope, for instance, appropriate fixation approaches can be utilized that would occur to a person of ordinary skill in this art.

The hold-down bar 42 is disposed on an outside or upper surface of the tarp 20 (i.e. on a surface of the tarp 20 that faces away from the interior volume of the container 12). The first cable 46a is attached to one end of the hold-down bar 42 while the second cable 46b is attached to the other end of the hold-down bar 42. The first and second cables 46a and 46b extend from the respective first and second biasing mechanisms 44a and 44b around the sides of the tarp 20 and onto the hold-down bar 42.

Figure 4:
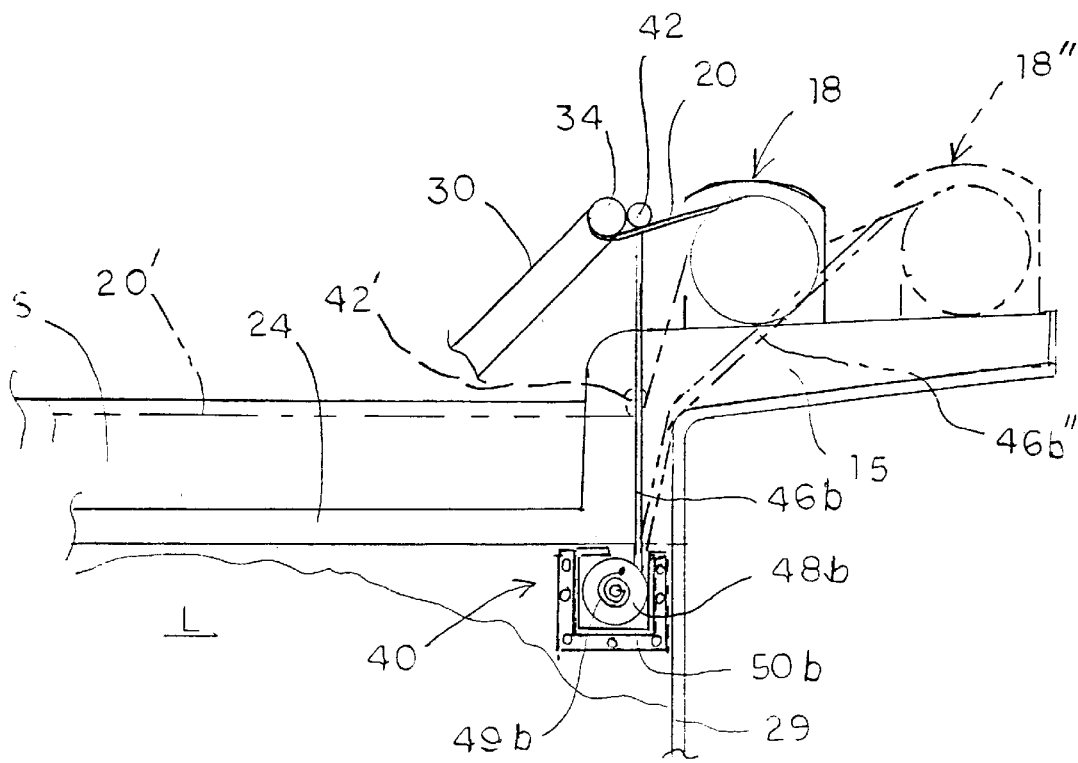
FIG. 4 is a partial side view of the hold-down system depicted in FIGS. 2 and 3, with the hold-down system shown in different operative orientations.

Referring to FIGS. 3 and 4, the hold-down system 40 is shown in greater detail. More specifically, the mechanism includes the first and second biasing mechanisms 44a, 44b disposed within the container on the opposite side walls 23, 25, respectively. In one feature of the invention, the entire hold-down system resides within the vertical envelop of the container 12. In other words, none of the components of the mechanism 40 extend beyond the side walls of the container. Moreover, the bulk of the hold-down system is situated within the interior of the container, rather than on the outside of the container or vehicle, as with prior tarp hold-down systems.

It is understood that the two biasing mechanisms 44a, 44b can be identically configured. In accordance with one embodiment of the invention, the biasing mechanisms 44a, b can include a reel, spool, roller or the like 48a, b that is preferably, but not necessarily, situated in a housing 50a, b. The housing 50a, b may be open at its top (as depicted in FIG. 3) or may be closed except for an opening for passage of the cable. Since the biasing mechanisms 44a, 44b are situated within the container, the corresponding housing 50a, 50b can be configured to protect the components of the mechanisms from the load L housed with the container. Preferably, the housing can incorporate a mounting feature, such as the mounting flange depicted in FIG. 4, that facilitates attachment of the mechanisms to the interior of each side wall 23, 25. This attachment can be accomplished in a known manner, such as by bolts, screws, welding etc.

Each cable 46a, b is attached to a corresponding reel 48a, b such that rotation of the reel 48a, b either retracts (pulls down or tensions) the cable 46a, b or allows extension of (lets out) the cable depending on the direction of reel rotation. Each reel, such as reel 48b in FIG. 4, is spring loaded or biased in a manner that retracts the cable, such as cable 46b, into the housing 50b. Thus, in one embodiment of the invention, a torsion spring, such as spring 49b, is provided for each reel 48a, b. The torsion spring can be connected between the housing and the reel in a known manner. For instance, each reel can include a hub with a slot or opening for receiving one end of the torsion spring 49b. The housing 50b can be provided with a slot or opening to receive the opposite end of the spring to provide a reaction point for the spring.

An appropriate amount of bias for the first and second biasing mechanisms 44a and 44b can be determined by the amount of "pull down" force necessary to hold the front portion of the cover 20 down within the container body. Factors contributing to this determination include the anticipated wind force as the container body is traveling at road speeds, the expected road vibration that the cover will encounter, and the retraction or tensioning force that the cover may experience when it is in its fully extended position. Thus, when the cover is fully unrolled across the container, the hold-down system is sufficiently strong to pull the front portion of the cover down across the load L.

The biasing mechanisms 44a and 44b are situated on the inside of the container 12 and preferably just below the corresponding top rail 24 and 26. Particularly, each biasing mechanism 44a, b is situated on the inside of a corresponding side wall 23, 25 below the top rail. Preferably, the first and second biasing mechanisms 44a and 44b are coaxially aligned on the inside of the container 12 so that the extension and tension in each cable 46a, b is consistent. The biasing mechanisms 44a and 44b may be positioned any distance from the front of the container 12, but are preferably situated as close as possible to the cab shield 15 for embodiments where the container includes a cab shield, or toward the front of the container in other applications. In addition, the biasing mechanisms can be situated at any height within the container, including on the bottom wall 27 of the container. However, it is much preferred that the mechanisms be mounted as close to the top rails 24, 26 as possible to minimize the risk of fouling the mechanisms with the load L material carried by the container.

In one form, the hold-down bar 42 may be stationary relative to the cover 20, meaning primarily that the hold-down bar 42 may be rotationally stationary (along a longitudinal axis thereof) relative to the cover 20. In another form, the hold-down bar 42 may be free to rotate in both directions either as one piece or as several pieces. The hold-down bar 42 could even be rotated automatically if desired. In the instance that the hold-down bar 42 is rotatable, the hold-down bar 42 can be coupled to the cordage members 46a and 46b by way of the spindle 43. The hold-down bar may include multiple segments mounted on the spindle.

In another contemplated form, the hold-down bar 42 may incorporate a roller, rolling mechanism, reel, spool or the like that is coupled to cordage that is fixed to tie-downs (not shown) on the interior of the container 12. The rolling mechanism is biased in like manner to the reels 48a and 48b and operates in a manner opposite but similar to that described above. In other words, the hold-down bar can include interior torsion springs mounted within the hold-down bar. In this embodiment, the torsion springs can engage a spindle, such as spindle 43, mounted within the hold-down bar and engaged at its ends to the cordage. The cordage can wind around the spindle, or can wind around reels, such as the reels 48a, b mounted to the ends of the spindle.

As shown in FIG. 4, the hold-down system 40 is shown in its operative positions. In a first position, the tarp 20 is in its open or stowed position in which the bail arm 30 is retracted against the retraction mechanism 18. In this position, the deployment bar 34 is directly adjacent the retraction mechanism. The hold-down bar 42 is trapped between the deployment bar 34 and the retraction mechanism. In this position, the cable 46b is at least partially extended or uncoiled from the reel 48b. In some installations, this position may be the farthest that the cable will extend from the reel. The tarp is also shown in a partially deployed position 20' (depicted in phantom lines in FIG. 4), with the hold-down bar in a partially retracted position 42'.

The retraction mechanism 18 is shown in one position in FIG. 4 essentially at the inboard end of the cab protector 15. In some installations, the retraction mechanism is shifted to the front end of the cab protector, such as the mechanism 18" shown in phantom lines in the figure. With the mechanism moved farther forward on the cab protector, the cable will be extended farther from the reel and bend around the front wall 29 of the container, as depicted by the cable 46b", also shown in phantom lines.

Figure 5B:
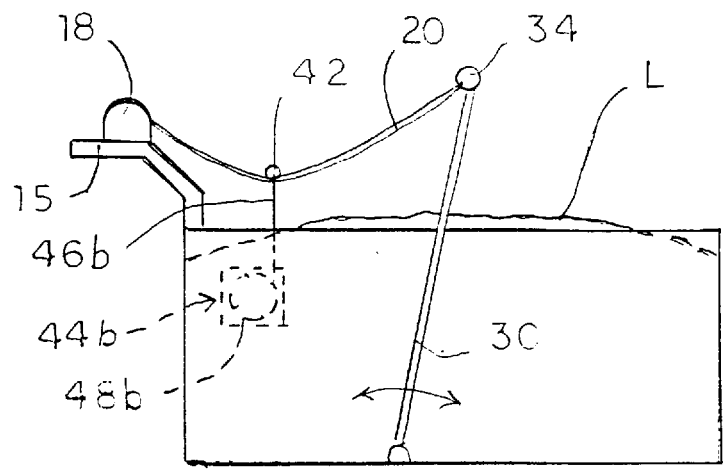
Figure 5C:
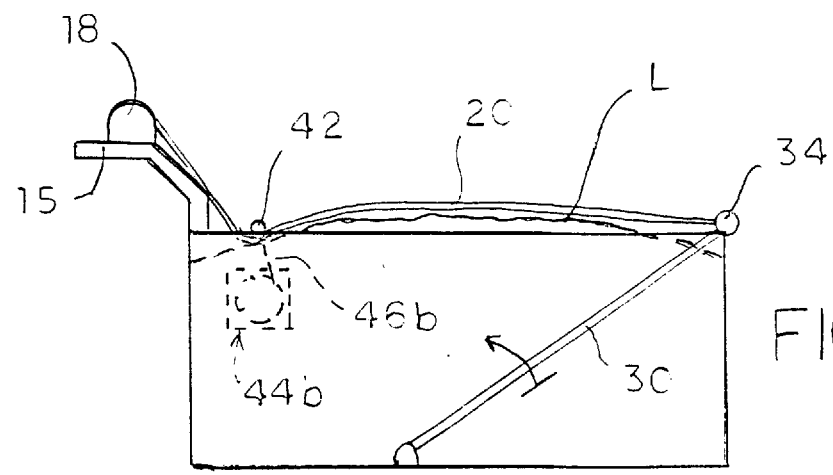

Referring now to sequential figures FIGS. 5A, 5B and 5C, an exemplary mode of operation of the hold-down system 40 is illustrated. As shown in FIG. 5A, the extension arm 30 pivots in the direction of the arrow to extend the cover 20 over the load L and pay it out from the retraction mechanism 18. It should be appreciated that the cover 20 is in its retracted mode or stowed position in FIG. 5A. The hold-down bar 42 is drawn upward against the biasing force of the biasing members 44a and 44b.

As the cover 20 is extended over the load L through action of the arm 30 as depicted in FIG. 5B, the hold-down bar 42 pulls down on the cover 20. Of course, the bail arm 30 will be exerting an upward force on the tarp 20 as the arm sweeps through its arc. This upward force places the tarp under tension which acts against the downward force being exerted on it by the hold-down bar 42. In the position shown in FIG. 5b the tarp tension is sufficient to pull the cable 46b out of the reel 48b. Ordinarily the tension exerted by the hold-down system 40 will keep the hold-down bar 42 generally centered above the reel assembly 44b, particularly if the hold-down bar is equipped to roll relative to the tarp 20. However, as the tarp is deployed, the hold-down bar 42 may tend to move with the tarp until the cable tension pulls the bar back over the reel assembly.

As the arm 30 nears the end of its stroke, as depicted in FIG. 5C, the tension in the tarp 20 is reduced. Some retraction mechanisms 18 are configured to pay out additional tarp when the bail arm reaches the end of the container. In this case, the tension in the tarp will fall essentially to nothing, so the reel assemblies 44a, b will easily be operated to draw the hold-down bar 42 into the container 12. Even where there is some residual tension in the tarp 20, the hold-down system 40 can be calibrated to generate sufficient tension or retraction force to pull the hold-down bar downward against this residual tarp tension. When the hold-down bar is pulled downward, it pulls the front end of the tarp down with it, as shown in FIG. 5c.

Of course, when it is desired to retract the cover 20, the extension and retraction mechanisms can be operated in their normal manner. As the bail arm 30 moves away from its extended position shown in FIG. 5c it follows the path shown in FIG. 5b. Of course, the hold-down system 40 continues to operate on the return stroke as shown in FIG. 5b. The hold-down bar 42 will thus continue to pull down on the tarp as it is being retracted, which can help prevent flapping of the tarp during this operation.

From the foregoing description, it should be appreciated that the present invention provides a simple and economical system for holding a flexible cover down over an open-topped container. The hold-down system 40 allows the present invention to be retrofitted to an existing cover system by simply mounting the reel assemblies 44a, b to opposite sides of the container and positioning the hold-down bar 42 on the exposed side of the tarp.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For example, the preferred embodiment contemplates a torsion spring, such as spring 49b shown in FIG. 4, that constantly exerts a retraction force on the cable 46b. It is understood that a similar torsion spring is preferably included with the reel 48a on the opposite side wall of the container. In the usual mode of usage of the hold-down system 40, the hold-down bar need only pull the front end of the tarp down when the tarp is extended over the load. Thus, in an alternative embodiment, the torsion spring can be modified to include a free-wheel condition in which the cables 46a, b can be deployed from the reels 48a, b without any resistance. When it is desired to employ the hold-down bar to hold down the front of the tarp, the torsion spring can be re-engaged to exert a pull-down force on the hold-down bar and ultimately the tarp. Thus, the invention contemplates the introduction of a clutch between the torsion spring, such as spring 49b, and reel 48a, b.

As a further alternative, the torsion spring can be configured to provide a variable torque, and consequently a variable force pulling the hold-down bar downward. For example, the pull-down force need not be significant while the tarp is being deployed, such as when the tarp is in the positions shown in FIGS. 5a, 5b. The need for the pull-down force is generally limited to when the tarp has been fully deployed, as shown in FIG. 5c. Thus, the torsion spring can generate a minimum torque when the cables 46a, b are extended beyond a certain length and a maximum torque when the cables are at their shorter extension shown in FIG. 5c.

As a further modification, the biasing mechanisms 44a, b can include provisions to lock the corresponding reels 48a, b when the tarp has been deployed as shown in FIG. 5c. With this modification, the cables will not extend and retract against the torsion spring, which means that the hold-down bar 42 will remain relatively stationary and tightly holding down the front end of the tarp. Without this modification, a certain amount of bounce of the hold-down bar may be expected due to excessive road vibration or under the influence of very high winds. Nevertheless, even in the absence of such a lock-out feature, the hold-down system 40 of the present invention will provide sufficient hold-down force for normal travel conditions.

The preferred embodiment includes a torsion spring 49b that generates the tension or pull-down force through the hold-down bar. Other resilient members are contemplated by the present invention. For instance, the cable ends can be connected to linear springs mounted within the housings 50a, b.

Figure 6:
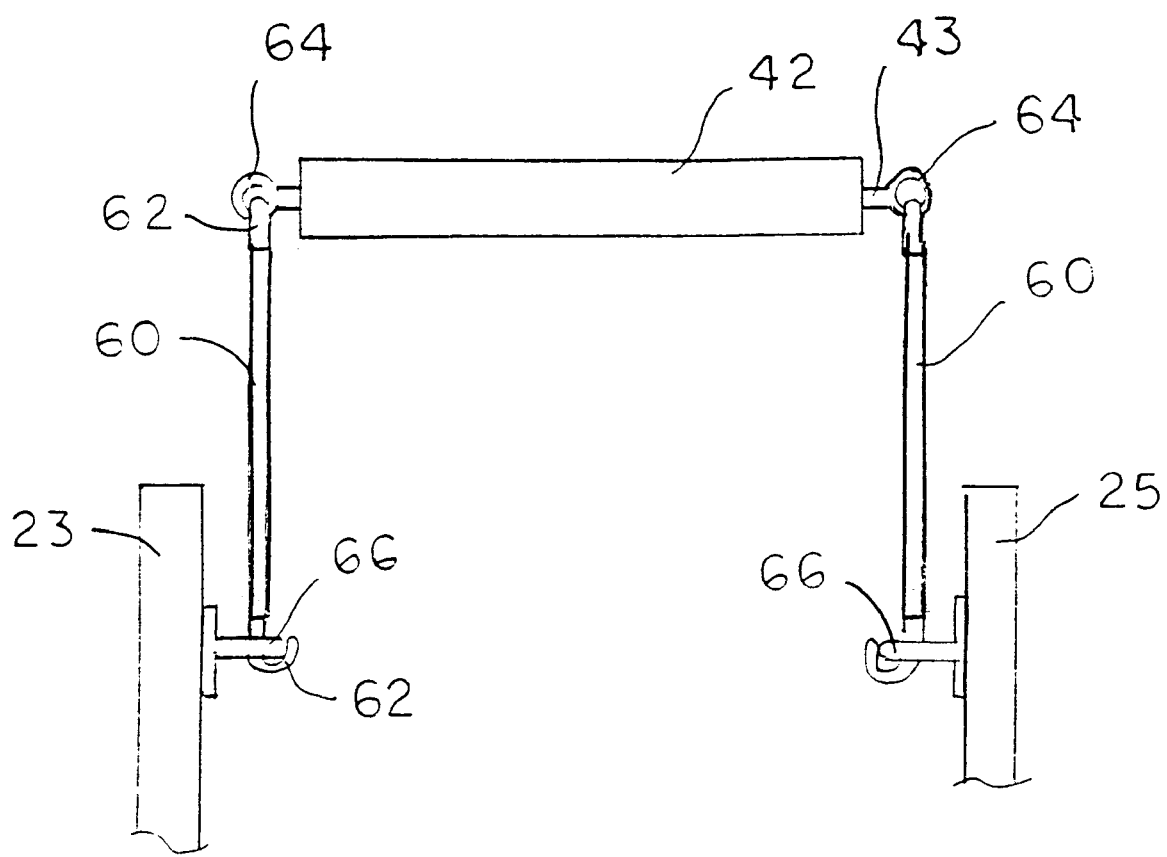
FIG. 6 is an end view of an alternative hold-down system in accordance with a further embodiment of the invention.

In certain embodiments, the torsion springs can be eliminated and the resilient or elastic capabilities of the hold-down system 40 implemented by the cables 46a, b themselves. For example, the cables can themselves be elastic, such as a bungee cord. Thus, in an alternative embodiment shown in FIG. 6, an elastic cord 60 can be provided with hooks or eyelets 62 at its opposite ends. The eyelets can engage an eyelet 64 at each end of the spindle 43 extending through the hold-down bar 42. The hooks at the opposite end of the elastic cords 60 can engage eyelets 66 mounted to the opposite side walls 23, 25. The hooks 62 and eyelets 64 and 66 can assume a variety of configurations that accomplish connecting the elastic cords 60 between the ends of the hold-down bar 42 and the container walls 23, 25. A housing can be provided around the portion of the elastic cords and their associated connection devices that are within the interior of the container.

What is claimed is:

1. A hold-down system for holding down a cover on a load within an open-topped container having opposite side walls, and a bottom wall, the side walls and bottom wall defining an interior for holding a load, comprising:
   a hold-down member adapted to bear on an outside surface of the cover; and
   a biasing mechanism mounted between the side walls in the interior of the open-topped container and connected to said hold-down member, said biasing mechanism operable to exert a force tending to pull said hold-down member into the interior of the container.

2. A hold-down system for holding down a cover on a load within an open-topped container having side walls, and a bottom wall defining an interior for holding the load, comprising:
   a hold-down member adapted to bear on an outside surface of the cover; and
   a biasing mechanism mounted to the open-topped container and connected to said hold-down member, said biasing mechanism operable to exert a force tending to pull said hold-down member into the interior of the container, wherein said biasing mechanism includes flexible cordage connected between said hold-down member and the side walls of the container.

3. The biasing mechanism according to claim 1, wherein said hold-down member includes an elongated rod.

4. The hold-down system according to claim 3, wherein said elongated rod includes a longitudinal axis and is rotatably connected to said biasing mechanism so said rod can rotate about its longitudinal axis relative to the cover.

5. A hold-down system for holding down a cover on a load within an open-topped container having side walls, and a bottom wall defining an interior for holding the load, comprising:
    a hold-down member adapted to bear on an outside surface of the cover; and
    a biasing mechanism mounted to the open-topped container and connected to said hold-down member, said biasing mechanism operable to exert a force tending to pull said hold-down member into the interior of the container, wherein said biasing mechanism includes;
    elongated cordage connected at one end thereof to said hold-down member;
    a reel rotatably mounted to one of the side walls of the container, wherein the other end of said elongated cordage is wound onto said reel; and
    a torsion spring connected to said reel and operable to rotationally bias said reel to wind said cordage.

6. The hold-down system according to claim 5, wherein:
    said elongated cordage includes a first cord and a second cord, one end of each of said cords connected to said hold-down member; and
    said biasing mechanism includes a first reel rotatably supported on one of the side walls of the container and a second reel rotatably supported on an opposite one of the side walls of the container, wherein the other end of the first cord is wound onto said first reel and the other end of said second cord is wound onto said second reel.

7. The hold-down system according to claim 6, wherein said first and said second reels each include a torsion spring connected thereto and operable to rotationally bias said reel to wind said cordage thereon.

8. The hold-down system according to claim 7, wherein said hold-down member includes an elongated bar and said first cord is connected to one end of said bar and said second cord is connected to the opposite end of said bar.

9. A hold-down system for maintaining a cover for an open topped container taut over the interior of the container, the container having side walls and a bottom wall defining the interior of the container, the hold-down system comprising:
    a biasing subsystem situated below a plane of the container defined by top surfaces of the side walls of the container and within the interior of the container;
    a hold-down member configured to extend along an outside surface of the cover; and
    means for operatively coupling said biasing subsystem to said hold-down member, wherein said biasing subsystem is operable to exert a force tending to pull said hold-down member into the interior of the container.

10. A hold-down system for maintaining a cover for an open topped container taut over the interior of the container, the container having side walls, the hold-down system comprising:
    a biasing subsystem situated below a plane of the container defined by top surfaces of the side walls of the container;
    a hold-down member configured to extend along an outside surface of the cover; and
    means for operatively coupling said biasing subsystem to said hold-down member, wherein said biasing subsystem is operable to exert a force tending to pull said hold-down member into the interior of the container, and wherein said means for coupling comprises cables.

11. The hold-down system according to claim 9, wherein said biasing subsystem comprises a biased reel.

12. The hold-down system according to claim 9, wherein said hold-down member comprises a longitudinal rod.

13. The hold-down system of claim 12, wherein said longitudinal rod includes a longitudinal axis and is rotatable about its longitudinal axis.

14. The hold-down system of claim 9, wherein said biasing subsystem is disposed within the interior of the container and below said hold-down member.

15. The hold-down system of claim 9, wherein said biasing subsystem comprises first and second biased reels.

16. A method of maintaining a cover for an open topped container taut, the method comprising:
    providing a hold-down member that is adapted to extend a distance along an outside surface of the cover;
    providing a first biasing mechanism on a first inside surface within the interior of the container, the first biasing mechanism operative to provide a constant tension against a first connecting member;
    providing a second biasing mechanism on a second inside surface within the interior of the container, the second biasing mechanism operative to provide a constant tension against a second connecting member; and
    coupling the first and second connecting members to the hold-down member such that the constant tensioning is translated to the hold-down member.

17. The method according to claim 16, wherein the step of providing a hold-down member that is adapted to extend a distance along an outside surface of the cover includes providing a hold-down member that is adapted to extend a distance along a short length of the cover.

18. The method according to claim 16, wherein the step of providing a hold-down member that is adapted to extend a distance along an outside surface of the cover includes providing an elongated hold-down member that is adapted to rotate relative a longitudinal axis thereof.

19. The method according to claim 18, wherein:
    the step of providing a first biasing mechanism on a first inside surface of the container, includes providing the first connecting member comprising a cable; and
    the stet of providing a second biasing mechanism on a second inside surface of the container, includes providing the second connecting member comprising a cable.

* * * * *